United States Patent [19]

Lee et al.

[11] Patent Number: 5,614,951
[45] Date of Patent: Mar. 25, 1997

[54] APPARATUS AND METHOD UTILIZING A SLOPE FOR AUTOMATICALLY FOCUSING AN OBJECT IN A VIDEO CAMERA

[75] Inventors: Seoung E. Lee; Jee Y. Jang, both of Kyungki-Do, Rep. of Korea

[73] Assignee: Goldstar Co., Ltd., Rep. of Korea

[21] Appl. No.: 601,466

[22] Filed: Feb. 14, 1996

Related U.S. Application Data

[63] Continuation-in-part of Ser. No. 390,806, Feb. 15, 1995, abandoned, which is a continuation of Ser. No. 159,792, Nov. 30, 1993, abandoned.

[30] Foreign Application Priority Data

Nov. 30, 1992 [KR] Rep. of Korea ................. 22819/1992
Dec. 2, 1992 [KR] Rep. of Korea ................. 23130/1992

[51] Int. Cl.$^6$ ............................................. H04N 5/232
[52] U.S. Cl. ................................... 348/356; 348/355
[58] Field of Search .................................. 348/345, 349, 348/350, 354, 355, 356; 358/906; 354/400, 402; H04N 5/232

[56] References Cited

U.S. PATENT DOCUMENTS

| | | | |
|---|---|---|---|
| 4,484,806 | 11/1984 | Onishi | 354/404 |
| 4,531,158 | 7/1985 | Murakami | 358/227 |
| 4,544,953 | 10/1985 | Goldman | 358/227 |
| 4,672,456 | 6/1987 | Murai | 358/227 |
| 4,782,396 | 11/1988 | Park | 358/227 |
| 4,853,788 | 8/1989 | Murashima | 358/227 |
| 4,922,346 | 5/1990 | Hidaka | 358/227 |
| 4,967,280 | 10/1990 | Takuma | 358/227 |
| 5,003,339 | 3/1991 | Kikuchi | 354/402 |

*Primary Examiner*—John K. Peng
*Assistant Examiner*—Tuan V. Ho
*Attorney, Agent, or Firm*—Ostrolenk, Faber, Gerb & Soffen LLP

[57] ABSTRACT

An apparatus and a method for automatically focusing an object in a video cameras comprises a solid state image sensor for converting a light beam transmitted through a lens and an iris into an electrical signal, an amplifier for amplifying a video signal from the solid state image sensor, a video signal processor for processing the video signal amplified by the amplifier, high pass filters for high pass filtering the video signal amplified by the amplifier, a video divider for dividing the video signals filtered by the high pass filters in the unit of field, a low pass filter for low pass filtering the video signals divided by the video divider, an A/D converter for converting the video signals filtered by the low pass filter into digital signals, an integrator for integrating the digital signals from the A/D converter to output video detect data, and a microprocessor for checking a level of the video detect data from the integrator and outputting a control signal to a lens motor driver in accordance with the checked result to move the lens to a position at which the level of the video detect data becomes a peak value. An object motion diagnostic circuit senses a motion of the object to be focused and outputting a high signal to the microprocessor according to the sensed result to stop a motion of the lens during the motion of the object.

4 Claims, 6 Drawing Sheets

APPARATUS AND METHOD UTILIZING A SLOPE FOR AUTOMATICALLY FOCUSING AN OBJECT IN A VIDEO CAMERA

This is a continuation-in-part of application Ser. No. 08/390,806 filed on Feb. 15, 1995, now abandoned which is a continuation of application Ser. No. 08/159,792, filed Nov. 30, 1993, now abandoned.

BACKGROUND OF THE INVENTION

1. Field of the Invention

The present invention relates in general to automatically focusable video cameras, and more particularly to an apparatus and a method for automatically focusing an object in a video camera portion of a camcorder in which a motion speed of a video camera lens is controlled according to a slope of video detect data and the motion of the lens is stopped before a level of the video detect data reaches a peak value, so that an overshoot at the peak value can prevented and the object can be focused at a high speed.

2. Description of the Prior Art

Referring to FIG. 1, there is shown a block diagram of a conventional apparatus for automatically focusing an object in a video camera portion of a camcorder. As shown in this drawing, the conventional automatic focusing apparatus comprises a lens 1 for receiving a light beam from the object, an iris 2 for adjusting an amount off the light beam being received by the lens 1, a solid state image sensor 3 for converting the light beam of the amount adjusted by the iris 2 into an electrical signal and outputting the resultant video signal, an amplifier 4 for amplifying the video signal from the solid state image sensor 3, and a video signal processor 5 for processing the video signal amplified by the amplifier 4 so that the amplified video signal can be displayed on a screen.

Band pass filters (BPFs) 6 and 7 are provided in the conventional automatic focusing apparatus to filter the video signal amplified by the amplifier 4 at different frequency bands, respectively.

A video divider 8 is also provided in the conventional automatic focusing apparatus to divide the video signals filtered by the band Lass filters 6 and 7 in the unit of field to find the object to be focused.

The conventional automatic focusing apparatus also comprises an analog/digital (A/D) converter 9 for converting the video signals divided by the video divider 8 into digital signals an integrator 10 for integrating the digital signals from the A/D converter 9 to output video detect data for focusing the object, a main microprocessor 11 for outputting a focusing control signal in accordance with a level of the video detect data from the integrator 10, and a motor drive microprocessor 12 for outputting a control signal in response to the focusing control signal from the main microprocessor 11 to drive a lens motor driver 13.

The operation off the conventional automatic focusing apparatus with the above-mentioned construction will hereinafter be described.

First, the light beam from the object is received by the lens 1, the amount thereof being adjusted by the iris 2. The light beam of the amount adjusted by the iris 2 is converted into the electrical signal by the solid state image sensor 3. As a result, the video signal is generated from the solid state image sensor 3.

The video signal from the solid state image sensor 3 is amplified by the amplifier 4 and then processed by the video signal processor 5 so that it can be displayed on the screen. The video signal amplified by the amplifier 4 is also applied to the band pass filter 6.

In an initial focusing state, the video signal amplified by the amplifier 4 is filtered by the band pass filter 6 at the frequency band as shown in FIG. 3, which is a graph illustrating focusing steps which are performed by a conventional method of automatically focusing the object in the camcorder. The filtered video signal is divided in the unit of field by the video divider 8 for finding the object to be focused. The divided video signals are converted into the digital signals by the A/D converter 9 and then integrated by the integrator 10. As a result, the video detect data for focusing the object is generated from the integrator 10. The video detect data from the integrator 10 is applied to the main microprocessor 11.

The main microprocessor 11 analyzes the video detect data from the integrator 10 and checks a motion of the object to be focused, in accordance with the analyzed result. If the object has been moved, the main microprocessor 11 outputs the focusing control signal to move the lens 1 to a moved position of the object. The focusing control signal from the main microprocessor 11 is applied to the motor drive microprocessor 12.

In response to the focusing control signal from the main microprocessor 11, the motor drive microprocessor 12 detects the level of the video detect data and outputs the control signal to the lens motor driver 13 in accordance with the detected level of the video detect data to move the lens 1. Namely, the motor drive microprocessor 12 outputs the control signal to move the lens 1 to a position at which the level of the video detect data is increased.

The operation of the motor drive microprocessor 12 will hereinafter be described in detail with reference to FIG. 2 which is a flowchart illustrating the conventional method of automatically focusing the object in the camcorder.

First, the motor drive microprocessor 12 checks whether the video detect data is focusable stable data. If the video detect data is the focusable stable data, the motor drive microprocessor 12 outputs the control signal to the lens motor driver 13 to move the lens 1 by a desired distance. As a result, the lens 1 is moved by the lens motor driver 13 in response to the control signal from the motor drive microprocessor 12.

As the lens 1 is moved, new video detect data is applied to the motor drive microprocessor 12. The motor drive microprocessor 12 compares a level of the present video detect data with that of the previous video detect data. If the level of the present video detect data is greater than that of the previous video detect data, the motor drive microprocessor 12 outputs the control signal to move the lens 1 in the same direction as the present motion direction. On the contrary, if the level of the present video detect data is not greater than that of the previous video detect data, the motor drive microprocessor 12 outputs the control signal to move the lens 1 in the opposite direction to the present motion direction.

The above operation is repeatedly performed until the Level of the video detect data reaches a peak value at which the object is focused. After reaching the peak value, the level of the present video detect data becomes lower than that of the previous video detect data.

Then, the motor drive microprocessor 12 compares the level of the present video detect data with a predetermined threshold value. If the Level of the present video detect data is lower than the predetermined threshold, the motor drive microprocessor 12 outputs the control signal to move the lens 1 in the opposite direction to the present motion direction. On the contrary, if the level of the present video detect data is not lower than the predetermined threshold, the motor drive microprocessor 12 outputs the control signal to move the lens 1 in the same direction as the present motion direction until the level of the present video detect data becomes lower than that of the predetermined threshold value.

At this time, a counting operation is performed to count steps by which the lens 1 is moved until the level of the video detect data reaches the predetermined threshold value via the peak value. As a result, the lens 1 is moved by the counted value to focus the object.

Thereafter, the motor drive microprocessor 12 checks whether the object to be focused has been moved. If the object has been moved, the motor drive microprocessor 12 moves the lens 1 to a moved position of the object through the above operation to focus the object.

However, the above-mentioned conventional automatic focusing apparatus has a disadvantage in that the construction is complex since the separate motor drive microprocessor is required to control the lens drive motor. Also, in order to accurately focus the object, the lens must be again moved to the peak value after passing the peak value. This results in generation of an overshoot at the peak value. The generation of the overshoot results in a difficulty in obtaining a high picture quality. Further, because the lens is moved at a constant speed, it takes a long time to focus the object.

SUMMARY OF THE INVENTION

Therefore, the present invention has been made in view of the above problems, and it is an object of the present invention to provide an apparatus and a method for automatically focusing an object in a video camera in which a slope of video detect data is obtained, a motion speed of a lens is controlled according to the obtained slope of the video detect data, a separate lens drive microprocessor is removed and the motion of the lens is stopped before a level of the video detect data reaches a peak value, so that the object can be focused at a high speed, the construction is simple, an overshoot at the peak value can prevented and a high picture quality can be obtained.

In accordance with one aspect of the present invention, there is provided an apparatus for automatically focusing an object in a video camera, comprising a lens for receiving a light beam from the object; an iris for adjusting an amount of the light beam being received by said lens; solid state image sensing means for converting the light beam of the amount adjusted by said iris into an electrical signal and outputting the resultant video signal; amplification means for amplifying the video signal from said solid state image sensing means; video signal processing means for processing the video signal amplified by said amplification means so that the amplified video signal can be displayed on a screen; high pass filtering means for filtering the video signal amplified by said amplification means at different high frequency bands, respectively; video division means for dividing the video signals filtered by said high pass filtering means in the unit of field; low pass filtering means for filtering the video signals divided by said video division means at a low frequency band; analog/digital conversion means for converting the video signals filtered by said low pass filtering means into digital signals; integration means for integrating the digital signals from said analog/digital conversion means to output video detect data for focusing the object; and control means for checking a level of the video detect data from said integration means and outputting a control signal to a lens motor driver in accordance with the checked result to move said lens to a position at which the level of the video detect data becomes a peak value.

In accordance with another aspect of the present invention, there is provided a method of automatically focusing an object in a video camera, comprising the steps of: (a) moving a lens by a desired distance, calculating a slope of video detect data on the basis of the present video detect data detected from a video signal inputted as said lens is moved and the previous video detect data and varying a motion speed of said lens according to the calculated slope of the video detect data; (b) comparing the present video detect data detected at said step (a) with a predetermined reference value, selecting a video signal filtered at a sharp frequency band by a high pass filter if the present video detect data is smaller than the predetermined reference value and moving said lens by the desired distance to check whether the present video data detected from the video signal filtered at the sharp frequency band reaches a peak value; and (c) moving said lens before and behind the peak value if the present video data detected at said step (b) reached the peak value, to ascertain the peak value, checking whether the peak value has been moved with a motion of the object and controlling a focus of said lens if the peak value has been moved.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 4:
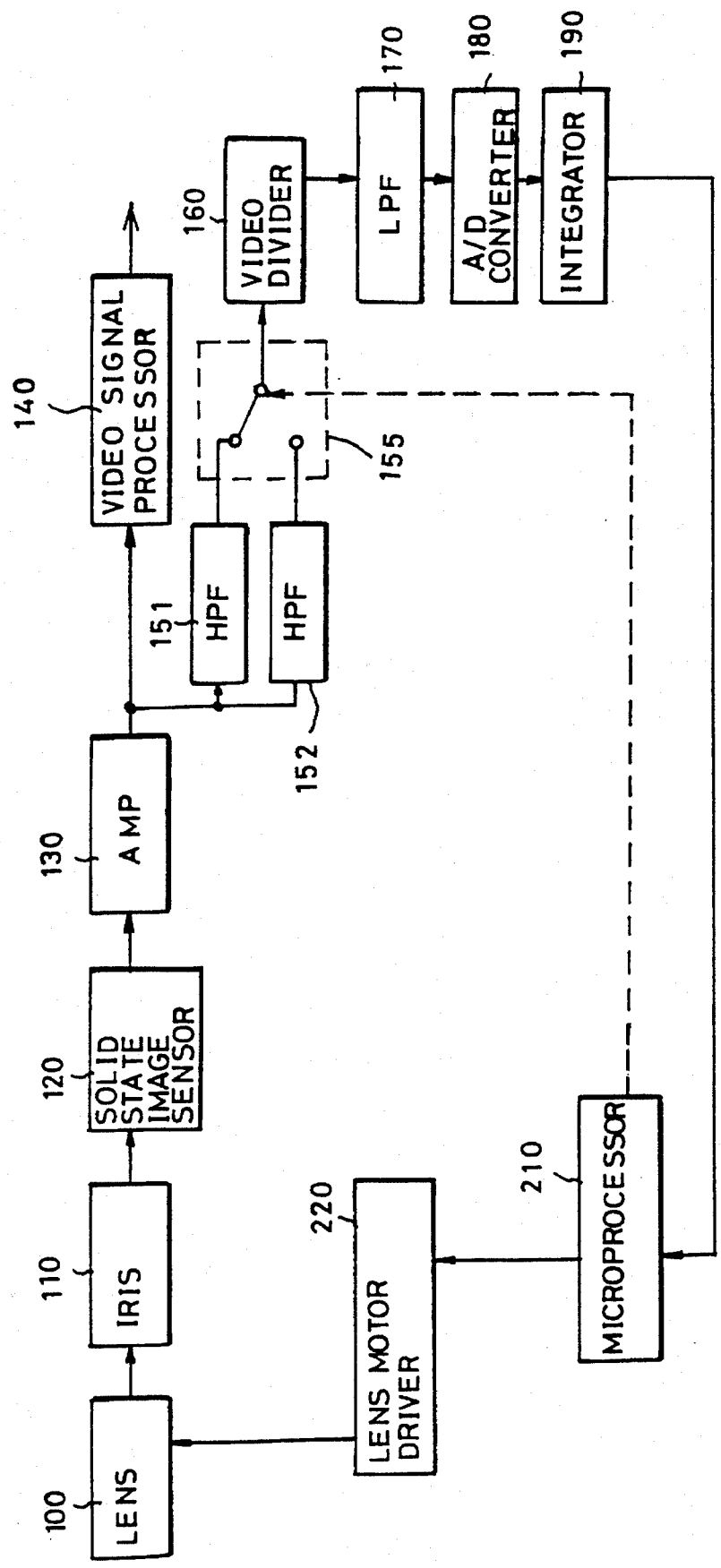
FIG. 4 is a block diagram of an apparatus for automatically focusing an object in a video camera in accordance with the present invention.

Referring to FIG. 4, there is shown a block diagram of an apparatus for automatically focusing an object in a video camera in accordance with the present invention. As shown in this drawing, the automatic focusing apparatus comprises a video camera lens 100 for receiving a light beam from the object, an iris 110 for adjusting an amount of the light beam being received by the lens 100, a solid state image sensor 120 for converting the light beam of the amount adjusted by the iris 110 into an electrical signal and outputting the resultant video signal, an amplifier 130 for amplifying the video signal from the solid state image sensor 120, and a video signal processor 140 for processing the video signal amplified by the amplifier 130 so that the amplified video signal can be displayed on a screen.

High pass filters (HPFs) 151 and 152 are provided in the automatic focusing apparatus to filter the video signal amplified by the amplifier 130 at different high frequency bands, respectively.

A switch 155 is provided for selecting one of the two high pass filters 151 and 152, in response to control signals received from a microprocessor 210.

A video divider 160 is also provided in the automatic focusing apparatus to divide the video signals filtered by the high pass filters 151 and 152 in the unit of field.

A low pass filter (LPF) 170 is also provided in the automatic focusing apparatus to filter the video signals divided by the video divider 160 at a low frequency band.

The automatic focusing apparatus also comprises an analog/digital (A/D) converter 180 for converting the video signals filtered by the low pass filter 170 into digital signals, an integrator 190 for integrating the digital signals from the A/D converter 180 to output video detect data for focusing the object, and a microprocessor 210 for checking a level of the video detect data from the integrator 190 and outputting a control signal to a lens motor driver 220 in accordance with the checked result to move the lens 100 to a position at which the level of the video detect data becomes a peak value, and also outputting a control signal to the switch 155 to allow appropriate switching to occur.

The operation of the automatic focusing apparatus with the above-mentioned construction in accordance with the present invention will hereinafter be described in detail with reference to FIGS. 4 to 7.

Figure 1:
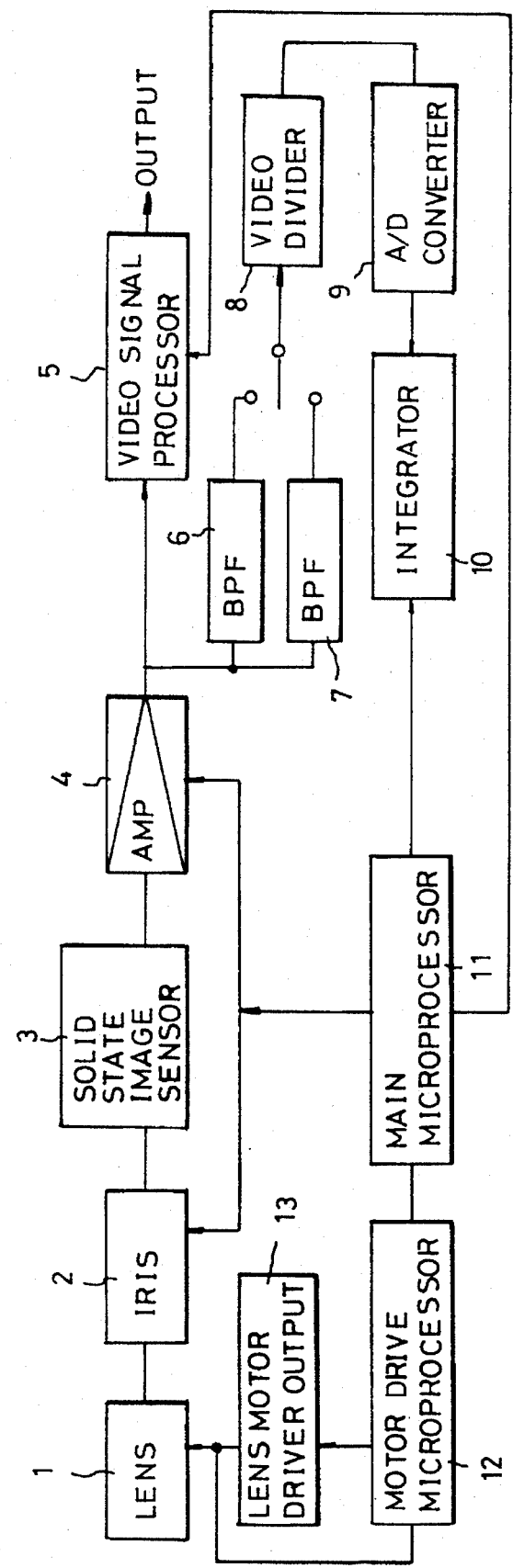
FIG. 1 is a block diagram of a conventional apparatus for automatically focusing an object in a video camera.
Figure 2:
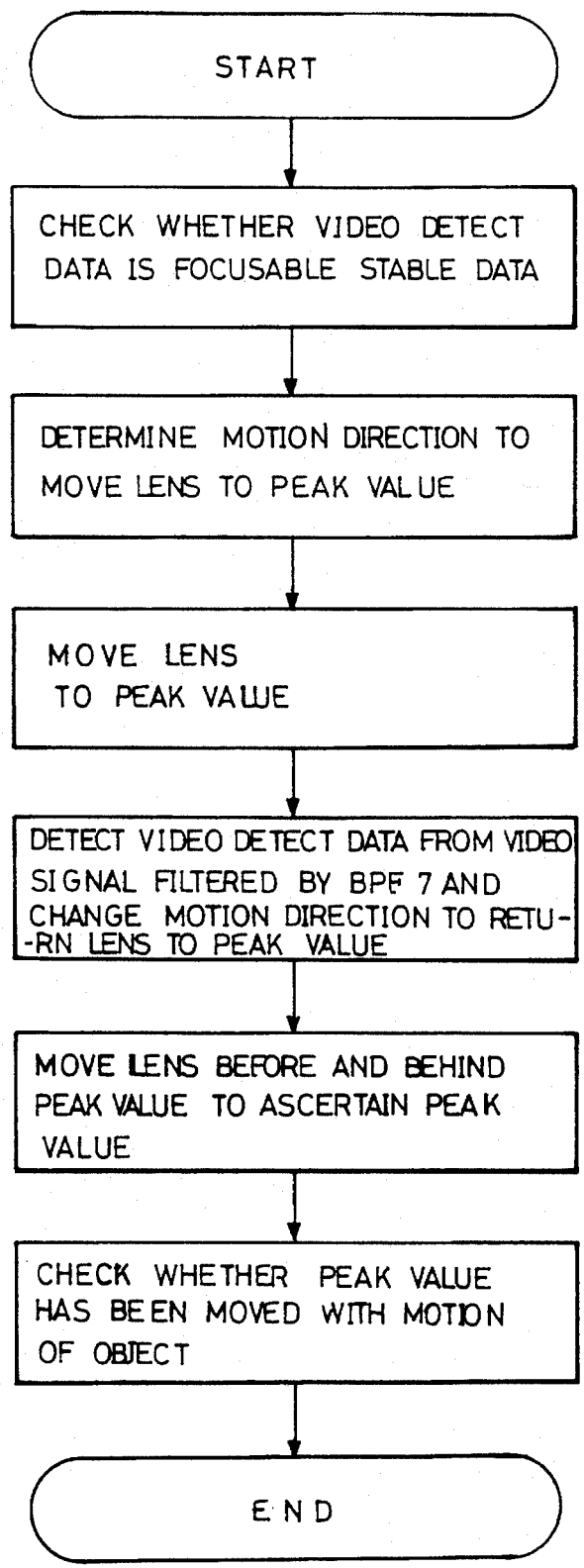
FIG. 2 is a flowchart illustrating a conventional method of automatically focusing the object in the video camera.
Figure 3:
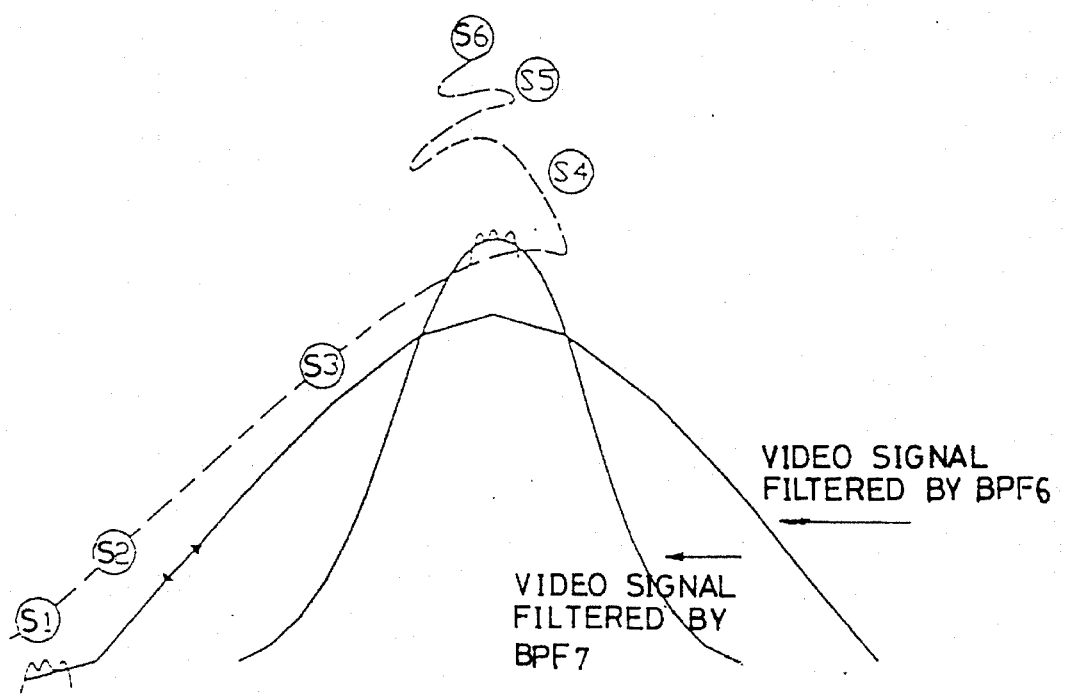
FIG. 3 is a graph illustrating focusing steps which are performed by the conventional method in FIG. 2.
Figure 6:
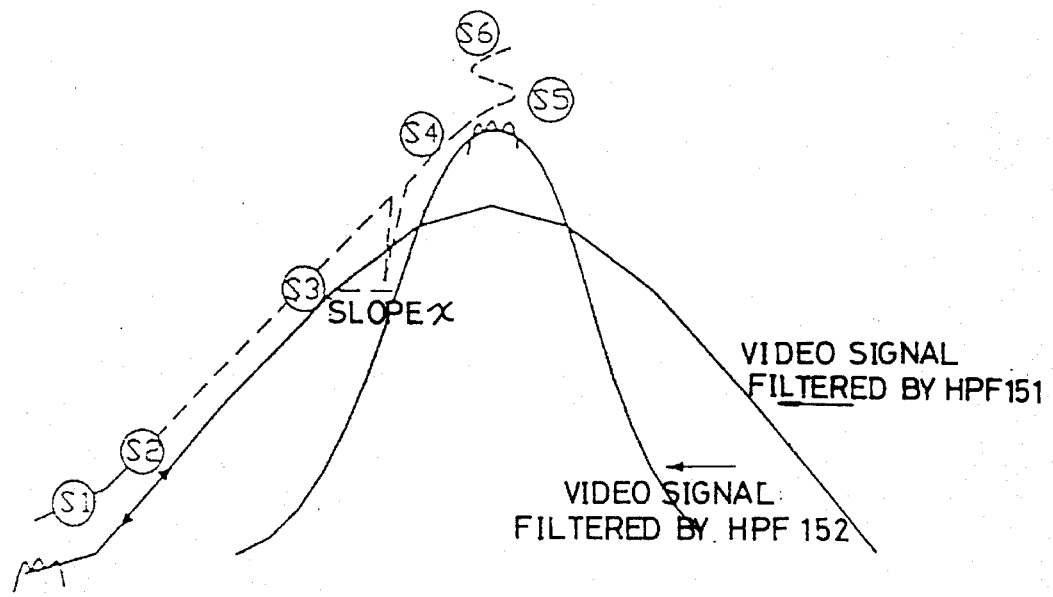
FIG. 6 is a graph illustrating focusing steps which are performed by the method in FIG. 5.
Figure 5:
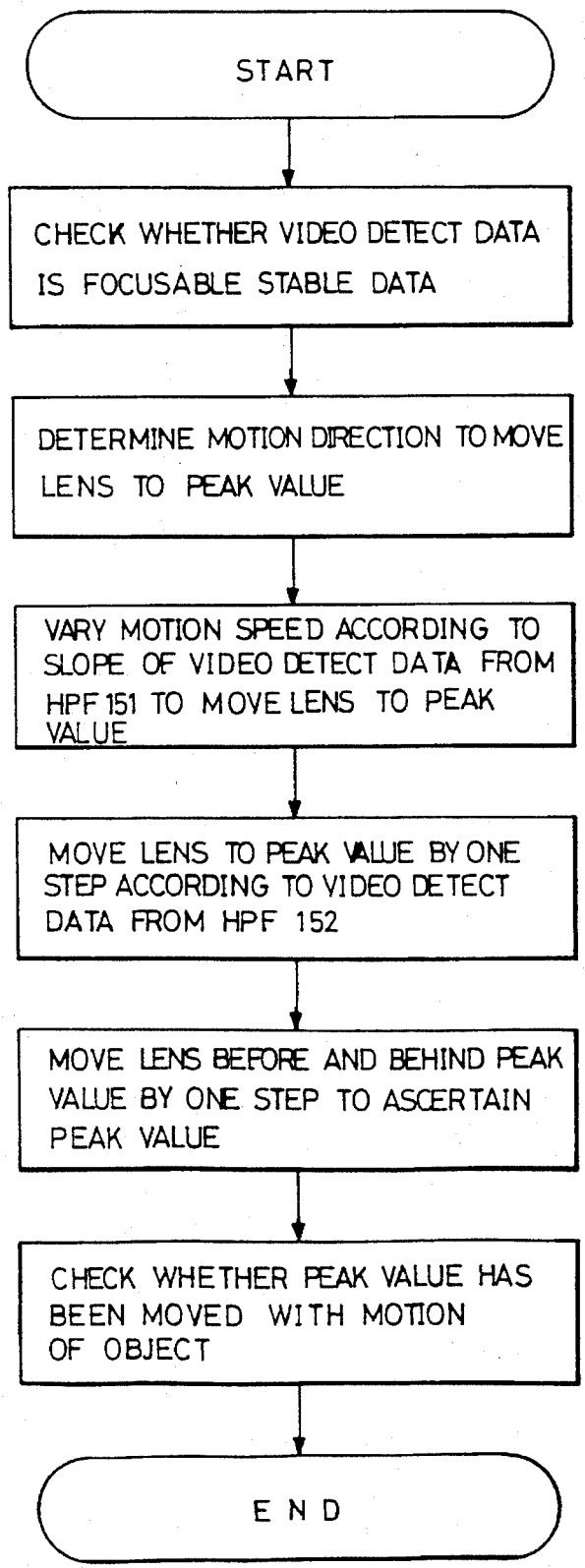
FIG. 5 is a flowchart illustrating a method of automatically focusing the object in the video camera in accordance with the present invention.
Figure 7:
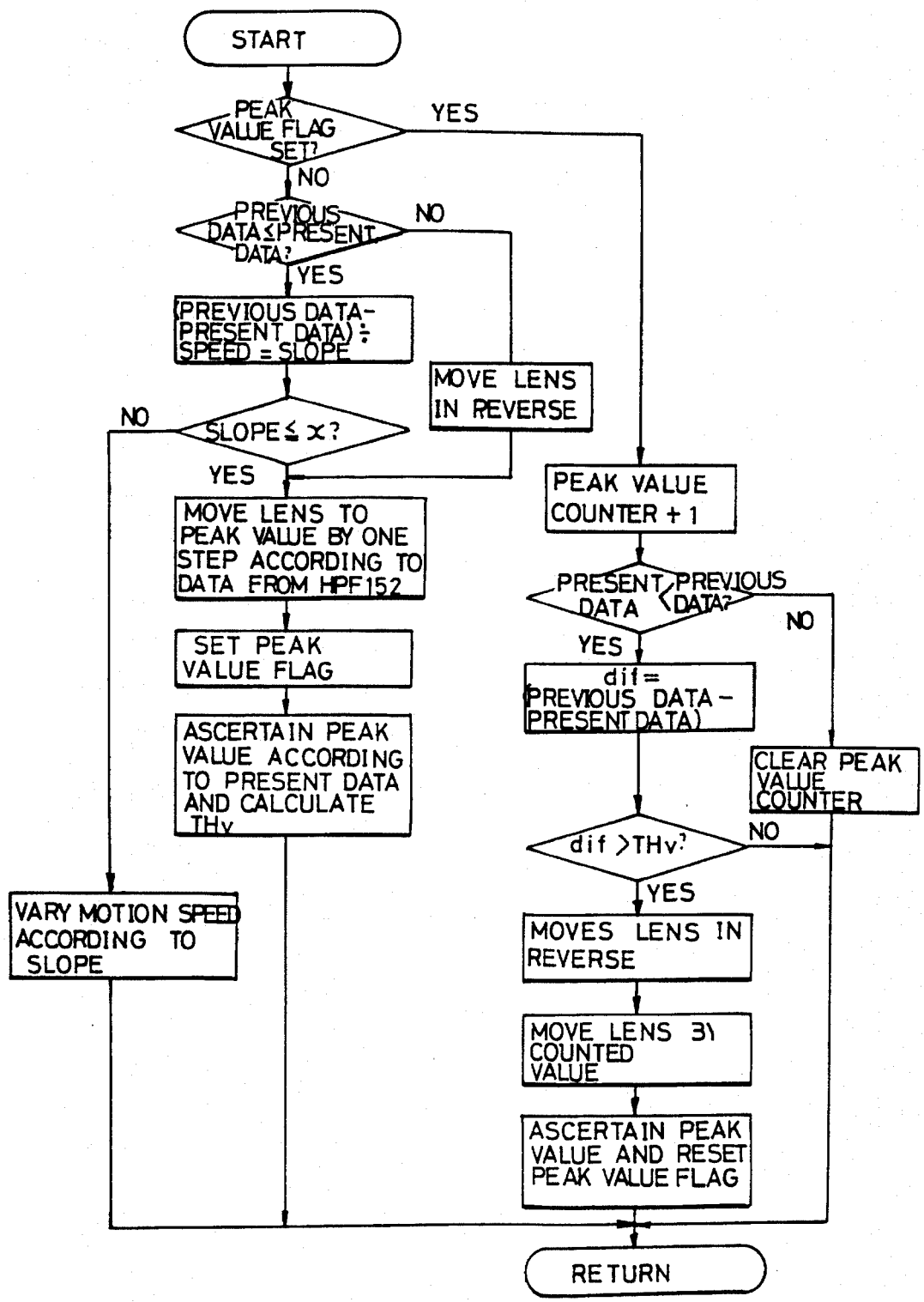
FIG. 7 is a flowchart illustrating, in detail, the method of automatically focusing the object in the video camera in accordance with the present invention.

FIG. 5 is a flowchart illustrating a method of automatically focusing the object in the video camera in accordance with the present invention, FIG. 6 is a graph illustrating focusing steps which are performed by the method in FIG. 5 and FIG. 7 is a flowchart illustrating, in detail, the method of automatically focusing the object in the video camera in accordance with the present invention.

First, the light beam from the object is received by the lens 100, the amount thereof being adjusted by the iris 110. The light beam of the amount adjusted by the iris 110 is converted into the electrical signal by the solid state image sensor 120. As a result, the video signal is generated from the solid state image sensor 120. The video signal from the solid state image sensor 120 is amplified by the amplifier 130 and then processed by the video signal processor 140 so that it can be displayed on the screen.

The video signal amplified by the amplifier 130 is first by the high pass filter 151 at the frequency band as shown in FIG. 6. The switch 155 is initially switched and maintained to allow the output of high pass filter 151 to be input to the video divider 160. The filtered video signal is divided in the unit of field by the video divider 160 and filtered by the LPF 170.

The divided video signals are converted into the digital signals by the A/D converter 180 and then integrated by the integrator 190. As a result, the video detect data for focusing the object is generated from the integrator 190. The video detect data from the integrator 190 is applied to the microprocessor 210.

As shown in FIGS. 5 and 7, the microprocessor 210 outputs the control signal to the lens motor driver 220 to move the lens 100 as shown in FIG. 6

As the lens 100 is moved, new video detect data is applied to the microprocessor 210. The microprocessor 210 compares a level of the present video detect data with that of the previous video detect data. If the level of the present video detect data is greater than or equal to that of the previous video detect data, the microprocessor 210 outputs the control signal to move the lens 100 in the same direction as the present motion direction. On the contrary, if the level of the present video detect data is not greater than or equal to that of the previous video detect data, the microprocessor 210 outputs the control signal to move the lens 100 in the opposite direction to the present motion direction.

The above operation is repeatedly performed. In operation, the microprocessor 210 determines whether a peak value flag is set, to check whether the level of the video detect data reaches the peak value at which the object is focused. If it is determined that the peak value flag is not set, the microprocessor 210 compares the level of the present video detect data (filtered by the high pass filter 151) with that of the previous video detect data. If the level of the present video detect data is greater than or equal to that of the previous video detect data, the microprocessor 210 outputs the control signal to move the lens 100 in the same direction as the present motion direction. On the contrary, if the level of the present video detect data is smaller than that of the previous video detect data, the microprocessor 210 outputs the control signal to move the lens 100 in the opposite direction to the present motion direction. In this case, the microprocessor 210 calculates a slope of the video detect data.

The slope of the video detect data is obtained by obtaining a difference between the present video detect data and the previous video detect data and dividing the obtained difference by a motion speed of the lens 100. In order to check whether the lens 100 reaches the peak value, the slope of the video detect data is compared with a predetermined reference value. As the slope of the video data approaches the predetermined reference value, the motion speed of the Lens 100 is varied from high to low.

If the slope of the video detect data is smaller than or equal to the predetermined reference value (x), the microprocessor 210 outputs a switching control signal to the switch 155 so that the switch is switched from HPF 151 to HPF 152, and the video signal amplified by the amplifier 130 is filtered by the high pass filter 152 at the frequency band as shown in FIG. 6. Also, in this case, the lens 100 is moved in reverse by desired steps and the peak value flag is set.

The above operation is repeatedly performed. In operation, when the video detect data reaches the peak value and then passes it, the slope thereof is gradually reduced. In this case, a reference value THv is calculated as a lower limit value of the video detect data.

Because the peak value flag is set, a peak value counter is incremented by one. The peak value counter is adapted to count steps by which the lens 100 is moved until the level of the video detect data reaches the reference value THv via the peak value. The microprocessor 210 compares the level of the present video detect data with that of the previous video detect data.

If the level of the present video detect data is lower than that of the previous video detect data, the difference between the present video detect data and the previous video detect data is compared with the reference value THv because the video detect data passed the peak value. If the difference between the present video detect data and the previous video detect data is smaller than or equal to the reference value THv, the motion of the lens 100 is stopped because the lens 100 reached the peak value. On the contrary, if the difference between the present video detect data and the previous video detect data is greater than the reference value THv, the lens 100 is moved to the peak value in the opposite direction to the present motion direction by the counted value from the peak value counter.

The motion speed of the video camera lens is controlled according to the obtained slope of the video detect data so that the object can be focused at the high speed. Also, a separate lens drive microprocessor is removed, resulting in a simplification in the construction. Further, the motion of the lens is stopped before the level of the video detect data reaches the peak value. Therefore, an overshoot at the peak value can prevented and high picture quality can be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for automatically focusing an object in a video camera, comprising:

a lens for receiving a light beam from the object;

a lens motor driver for moving said lens;

an iris for adjusting an amount of the light beam being received by said lens;

a solid state image sensing means for converting the light beam of the amount adjusted by said iris into an electrical signal and outputting a video signal;

an amplification means for amplifying the video signal from said solid state image sensing means;

a video signal processing means for processing the video signal amplified by said amplification means so that the amplified video signal can be displayed on a screen;

a plurality of high pass filters for filtering the video signal amplified by said amplification means, each of said high pass filters having a different cut-off frequency and respectively outputting an output signal;

control means for calculating a slope value of the video detect data corresponding to the signal outputted from a first one of said plurality of high pass filters having a first cut-off frequency when a peak value is not set and controlling a speed and direction of the lens motor driver according to the calculated slope value thereof until the calculated slope value is less than a first predetermined value, and for calculating a difference value of a video detect data corresponding to the signal outputted from a second one of said plurality of high pass filters having a higher cut-off frequency than said first one when the calculated difference value is less than a second predetermined value and controlling a speed and a direction of the lens motor driver according to the calculated difference value thereof;

a switching means for selecting the video signal output from one of said plurality of high pass filters in accordance with a control signal output from said control means;

a video division means for dividing the video signal selected by said switching means in the unit of a field;

a low pass filtering means for filtering the video signal divided by said video division means at a low frequency band;

an analog/digital conversion means for converting the video signal filtered by said low pass filtering means into a digital signal; and an integration means for integrating the digital signal from said analog/digital conversion means to output video detect data for focusing the object.

2. An apparatus for automatically focusing an object in a video camera, in accordance with claim 1, whereby the switching means appropriately selects an out put signal from one of said plurality of high pass filters in accordance with control signals output from said control means, when the calculated slope value is not greater than the first predetermined value.

3. A method of automatically focusing an object in a video camera having a plurality of high pass filters, comprising the steps of:

(a) calculating a slope value of a video detect data from a first high pass filter having a cut-off frequency when a peak value is not set and controlling a speed and a direction of a lens motor driver responsive to the calculated slope thereof;

(b) calculating a difference value of a video detect data from a second high pass filter having a higher cut-off frequency than said first high pass filter if the slope of the video detect data calculated at said step (a) is less than a first predetermined reference value and controlling the speed and the direction of the lens motor driver responsive to the calculated difference thereof; and (c) repeating said step (b) until the difference value calculated at step (b) is less than a second predetermined value and controlling the speed and the direction of the lens motor driver so that a lens is driven thereby to a focus position where the peak value is set.

4. A method of automatically focusing an object in a video camera, as set forth in claim 3, wherein the slope of the video detect data is obtained by obtaining a difference between the video detect data of a present field and a video detect data of a previous field, and dividing the obtained difference by a motion speed of the lens derived from an output data from said lens motor drive.

* * * * *